(12) United States Patent
Toss

(10) Patent No.: US 11,390,039 B2
(45) Date of Patent: Jul. 19, 2022

(54) IMPULSE WELDING BAR WITH NON-STICK COATING

(71) Applicant: TOSS GmbH & Co. KG Industrieprodukte, Alten-Buseck (DE)

(72) Inventor: Ramon Toss, Alten-Buseck (DE)

(73) Assignee: TOSS GmbH & Co. KG Industrieprodukte, Alten-Buseek (DE)

(*) Notice: Subject to any disclaimer, the term of this patent is extended or adjusted under 35 U.S.C. 154(b) by 0 days.

(21) Appl. No.: 17/242,521

(22) Filed: Apr. 28, 2021

(65) Prior Publication Data

US 2021/0331424 A1    Oct. 28, 2021

(30) Foreign Application Priority Data

Apr. 28, 2020   (DE) .................. 10 2020 111 524.5

(51) Int. Cl.
| | | |
|---|---|---|
| *B29C 65/38* | (2006.01) | |
| *B29C 65/00* | (2006.01) | |
| *B29L 7/00* | (2006.01) | |

(52) U.S. Cl.
CPC .......... *B29C 65/38* (2013.01); *B29C 66/0044* (2013.01); *B29L 2007/008* (2013.01)

(58) Field of Classification Search
CPC ............................ B29C 66/0044; B29C 65/38

USPC ......................................................... 156/289
See application file for complete search history.

(56) References Cited

U.S. PATENT DOCUMENTS

| | | | | |
|---|---|---|---|---|
| 2,904,100 | A * | 9/1959 | Fener | B29K 2827/18 156/583.2 |
| 3,982,991 | A * | 9/1976 | Hamm | B29C 65/18 156/515 |
| 4,010,063 | A * | 3/1977 | Natter | B29C 65/229 156/510 |
| 6,064,038 | A * | 5/2000 | Chou | B29C 66/8161 219/233 |
| 8,657,363 | B1 * | 2/2014 | Roush | B60P 3/20 296/186.1 |
| 2016/0272355 | A1 * | 9/2016 | Zurewich | B29C 66/43 |
| 2017/0113455 | A1 * | 4/2017 | Landa | B41J 2/0057 |

* cited by examiner

*Primary Examiner* — Scott W Dodds

(57) ABSTRACT

An impulse welding bar (10) for welding plastics films is provided with a detachable non-stick coating (20) which is held on lateral flanks (24) of the impulse welding bar (10). In order to facilitate the replacement of a worn non-stick coating (20), retaining elements (22) are provided which are made of two or more parts and which act in a form-fitting manner in order to detachably fasten the non-stick coating (20) to both flanks (24) of the impulse welding bar (10), wherein first parts (26) of the retaining elements (22) are arranged on the flanks (24) of the impulse welding bar (10) and second parts (36) of the retaining elements (22) are arranged on the non-stick coating (20).

12 Claims, 1 Drawing Sheet

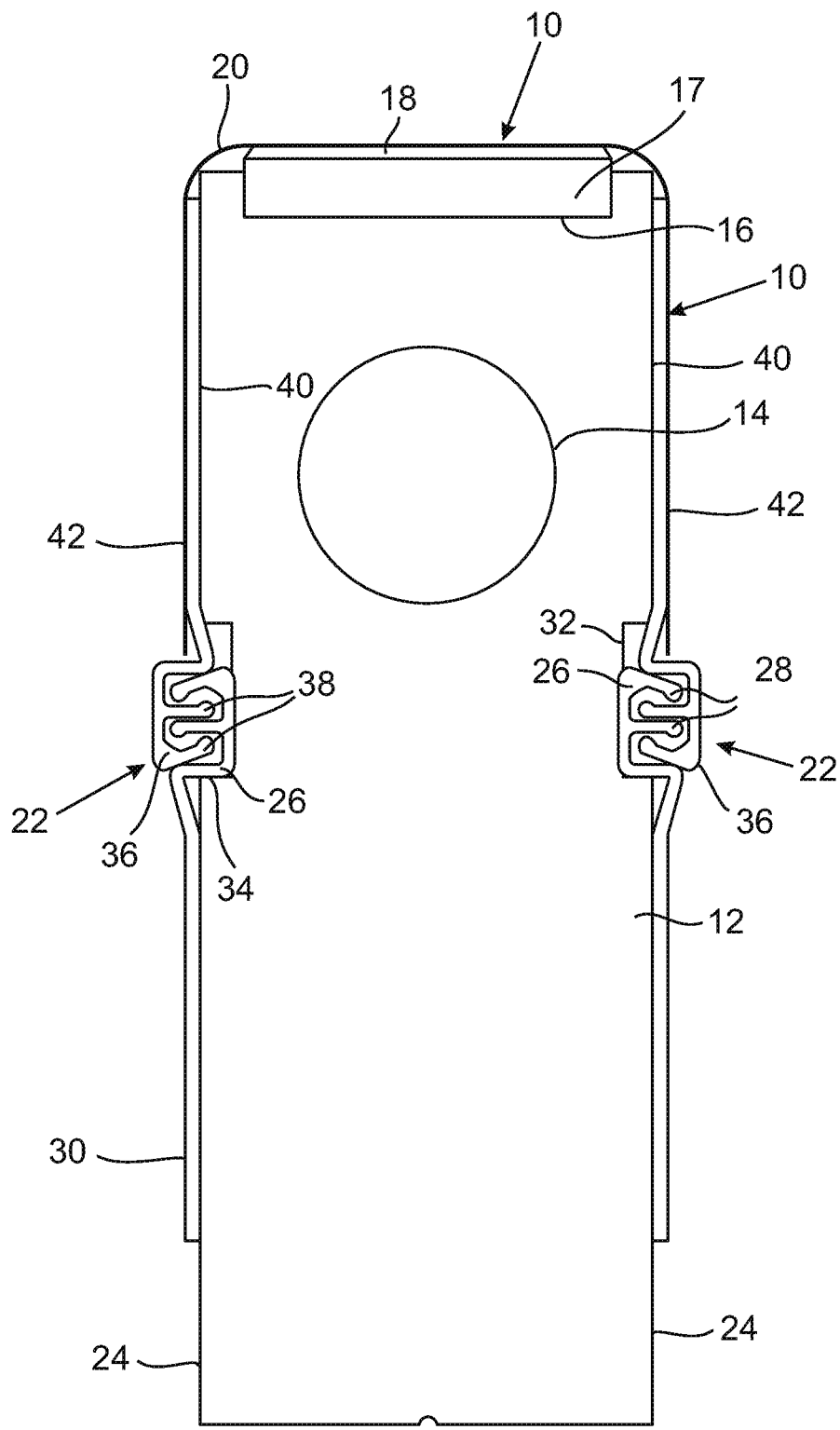

IMPULSE WELDING BAR WITH NON-STICK COATING

RELATED APPLICATION

This application claims the benefit of priority of German Patent Application No. 10 2020 111 524.5 filed on Apr. 28, 2020, the contents of which are all incorporated by reference as if fully set forth herein in their entirety.

FIELD AND BACKGROUND OF THE INVENTION

The present invention relates to an impulse welding bar for welding plastics films, comprising a detachable non-stick coating which is held on lateral flanks of the impulse welding bar.

Impulse welding bars for film welding have typical lengths of approx. 200 mm to more than 2,500 mm. They must be provided with a non-stick coating so that the welded seam is able to detach from the heating element. The non-stick coating is usually glued laterally. Some designs use complex mechanical fasteners.

A typical non-stick coating is designed as a PTFE glass fabric, which is self-adhesive in parts on its rear such that it can be glued directly to the impulse welding bar. There must be no adhesive in the region of the impulse band, as this would otherwise impede the thermal expansion. As the non-stick coating is subject to wear and tear, it must be replaced at regular intervals. It has been found that the self-adhesive layers cannot be removed from the impulse welding bar without leaving a residue, depending on their age and the stress they have been subjected to. Before a new non-stick coating can then be applied to the impulse welding bar in a self-adhesive manner, it is necessary to thoroughly clean the surfaces, which takes considerable time which in turn can lead to extended downtimes of the system. In most cases, it is also necessary to use solvents for cleaning, which leads to known problems from an environmental standpoint and in terms of workplace safety.

The problem addressed by the invention is to create an impulse welding bar which makes it possible to change a worn non-stick coating more easily and quickly without requiring a complex design.

According to the invention, the problem is solved in that, on an impulse welding bar, retaining elements are provided which are made of two or more parts and which act in a form-fitting manner in order to detachably fasten the non-stick coating to both flanks of the impulse welding bar, wherein first parts of the retaining elements are arranged on the flanks of the impulse welding bar and second parts of the retaining elements are arranged on the non-stick coating.

The impulse welding bar according to the invention offers the advantage that the detachable retaining elements make it possible to quickly and safely detach the wear part along with the second parts of the retaining elements from the first parts of the retaining elements connected to the impulse welding bar, and that a new non-stick coating can be attached by means of its second parts of the retaining elements to the first parts of the retaining elements that remain on the impulse welding bar. As no adhesive connection whatsoever is provided between the wearing non-stick coatings, including the second parts of the retaining elements, and the impulse welding bar, it can also be ensured that no residues of a worn non-stick coating remain adhered to the impulse welding bar.

SUMMARY OF THE INVENTION

In a preferred embodiment of the invention, the first parts of the retaining elements are glued to the flanks of the impulse welding bar.

Gluing the first parts of the retaining elements to the flanks of the impulse welding bar is unproblematic, as they remain on the impulse welding bar even when a worn non-stick coating is replaced, and therefore no cleaning work has to be carried out during a regular, wear-related replacement of the non-stick coating.

In another preferred embodiment of the invention, recesses are provided in the flanks of the impulse welding bar in the region of the first parts of the retaining elements, which recesses wholly or partially accommodate the first parts of the retaining elements.

The recesses can be useful if the first parts of the retaining elements require a certain amount of installation space, so that the retaining elements can be at least partially sunk into the recesses so as not to protrude too far laterally beyond the flanks of the impulse welding bar. Another advantage is that the recesses specify the exact position for the first parts of the retaining elements, such that they can be precisely positioned during assembly without further measures, thus also readily facilitating the correct alignment of the non-stick coating relative to the impulse welding bar via the second parts of the retaining elements provided on the non-stick coating.

In a simple embodiment of the invention, the retaining elements can be designed as spring snap fasteners. In this solution, at least two snap fasteners, as known from articles of clothing, are provided on each flank of the impulse welding bar in order to enable the non-stick coating to be positioned exactly. A disadvantage of this solution is the high precision with which the snap fastener parts have to be attached. If the distances between the female and male parts do not exactly match, the assembly is made more difficult or wrinkles appear in the coating. The different rates of thermal expansion of the main body of the bar and the PTFE coating must also be taken into account. The metal main body can heat up and expand during operation. The PTFE glass fabric, however, hardly expands. This results in stresses between the two. The effect is particularly noticeable with long bars.

As an alternative to the snap fasteners, the retaining elements can be designed as hook-and-loop fasteners. Hook-and-loop fasteners are easy to use and the associated parts can be easily connected flat to the flanks of the impulse welding bar and the non-stick coating. However, without further measures, it is not possible to precisely align the two parts of the retaining elements and thus of the non-stick coating relative to the impulse welding bar, as this solution does not provide an exact specification of the position on the bar. As with the typical gluing process, the operator has to align the coating very precisely for assembly. The problem with adhesive residues would still be avoided.

An embodiment of the invention is therefore particularly preferred in which the retaining elements are designed as grip seal strips.

It has been shown that grip seal strips, which are actually known from resealable bags from the packaging sector for the airtight sealing of such bags, are also suitable for precisely fastening the non-stick coating to the impulse welding bar in a detachable and replaceable manner and with sufficient retaining force. It is also readily possible to arrange the respective parts of the grip seal strips, which are hook-like, small plastics profiles that hook together and are detachable due to the deformability of the plastics material, on flat elements which then, in the case of the first parts of the retaining elements, can be glued to the flanks of the impulse welding bar and, in the case of the second parts of the retaining elements, can be glued to the non-stick coating. The two parts of the grip seal strips can be easily separated to remove a worn non-stick coating and connect to the second parts of a new non-stick coating.

In yet another, particularly preferred embodiment of the invention, the first parts of the grip seal strips are arranged in grooves in the flanks of the impulse welding bar. In the case of grip seal strips, these grooves form the recesses already mentioned above. The first parts are thereby aligned and a substantial portion of their cross-section can be sunk into the bar.

Preferably, the second parts of the grip seal strips are attached to the edges of the non-stick coating that spans the impulse welding bar. As already mentioned, this can be done in such a way that the strips are glued flat to the non-stick coating via lateral panel elements.

In a manner known per se, the non-stick coating can be formed by a coated fibre fabric which has sufficient mechanical strength to withstand the mechanical stresses occurring during operation. Glass or aramid fibres are typically used as the fabric material.

The actual non-stick effect is typically achieved in that the fibre fabric is coated or laminated with PTFE.

PTFE glass fabrics are used in the vast majority of applications. The qualities differ substantially in the fabric quality and the thickness ($g/m^2$) of the PTFE coating. There are also PTFE glass fabrics which have an additional graphite filling (antistatic finishing), or non-functional colouring. More rarely, polyimide films (trade name Kapton) are used instead. They have a higher temperature resistance, which is required for a few applications. There are also qualities which have polyimide film as a carrier material and PTFE as an additional non-stick layer.

In a preferred further embodiment of the invention it is provided that the impulse welding bar has a heat-resistant area on its upper side, over which an impulse heating band runs.

As a rule, the heat required for welding is generated in an impulse heating band through which an electric current flows and which is structurally separated from the pulse welding bar on its upper side. In order to protect the impulse rail itself from excessive heat input, the heat-resistant area is provided, which in the simplest case is formed in one piece with the impulse welding rail itself, which is made, for example, as an extruded profile.

Since the area stressed by the heat of the pulse welding tape can be subject to wear, it is preferably provided, that the pulse welding bar has a retaining groove on its upper side for receiving a heat-resistant support which forms the heat-resistant area. This can consist of different materials, e.g. a metal profile. The choice of material depends on the demands, as mentioned above, the support can also be designed in one piece with the rail in order to avoid replacement with the time-consuming removal of adhesive residues, whereby the rail may have to be replaced in the event of wear. Depending on the process, this can still be advantageous.

However, an embodiment of the invention is particularly preferred in which the heat-resistant support consists of a silicone rubber material which has proven to be particularly suitable for reducing the heat input into the splint.

BRIEF DESCRIPTION OF THE SEVERAL VIEWS OF THE DRAWING

In the following, an embodiment of the invention is discussed in greater detail with reference to the accompanying drawing. The FIGURE shows a cross section of an impulse welding bar comprising a non-stick coating comprising retaining elements according to the invention.

DESCRIPTION OF SPECIFIC EMBODIMENTS OF THE INVENTION

The accompanying drawing shows an impulse welding bar 10, which consists of a main body 12 made of metal, generally aluminium or steel, which is substantially rectangular in cross section and has a length tailored to the respective application. The impulse welding bar 10 can be designed having a circular channel 14 which, if required, allows for liquid cooling to dissipate heat.

On its upper side, the impulse welding bar 10 is provided with a retaining groove 16 for accommodating a heat-resistant support 17 as insulation, which can be made of silicone rubber material, for example. Above this support, an impulse heating band 18 extends over the entire length of the impulse welding bar 10, which impulse heating band generates the heat required for welding the foils (not shown) by having current flow through it. Electrical connections (not shown) for this purpose are located at the ends of the impulse welding bar 10 and are designed in a manner known per se. The heating band 18 is generally designed to be significantly narrower than the heat-resistant support 17.

In order to reliably prevent direct contact between the impulse band and the film to be welded, a non-stick coating 20 is provided, which is designed here as a strip-shaped PTFE glass fibre fabric. The PTFE glass fibre fabric spans the heating band 18 and, at its lateral edges 42, is detachably fastened to lateral flanks 24 of the impulse welding bar 10 via retaining elements 22 in the form of grip seal strips. The retaining principle of these grip seal strips is known from resealable film bags, but is not used here as an air-impermeable closure and instead is used for the detachable, precisely positioned attachment of the PTFE glass fibre fabric on the impulse welding bar 10.

The grip seal strips 22 are designed in two parts, the basic principle being one of interlocking plastics profiles 24 with a hook-shaped cross-section, which are here arranged in pairs. The detachment is provided by the ability of the plastics profile to deform when the grip seal strip is subjected to strong tension.

As mentioned, the two grip seal strips 22 are each designed in two parts, a first part 26 being associated with the impulse welding bar 10. The associated first pair 28 of hook-shaped plastics profiles is connected to a first panel element 30 or formed integrally therewith, which element is glued flat to the flanks 24 of the impulse welding bar 10. The plastics material is selected such that it can permanently withstand the heat and mechanical stress that occur, and the same also applies to the adhesive used.

Each of the first pair 28 of plastics profiles is located in a recess in the form of a groove 32 in the body 12 of the impulse welding bar 10, the lower edges 34 of which define the positions of the first parts 26 of the grip seal strips 22.

After pressing in the second parts 36 of the grip seal strips 22, which second parts in turn consist of pairs 38 of hook-shaped plastics profiles that correspond in their shape to the first pairs 28 and form-fittingly hook therewith when they are closed, the non-stick coating 20 is then likewise positioned in an exact manner.

The second pairs 28 of hook-shaped plastics profiles are connected to second panel elements 40 or formed integrally therewith, which elements are glued flat to edges 42 of the non-stick coating 20. Here, too, the plastics material is selected such that it can permanently withstand the heat and mechanical stress that occur, and the same naturally also applies here to the adhesive used.

To replace a worn non-stick coating 20, tensile stress is applied to its edges away from the flanks 24 of the impulse welding bar 10, such that the hook-shaped plastics profiles are deformed and the formfit between the parts 26, 36 of the grip seal strips 22 is released. The non-stick coating 20, which was only held by the grip seal strips 22, can be lifted off without leaving any residue.

A new non-stick coating 20 can then simply be installed by pushing its second pairs 38 of hook-shaped plastics profiles onto the first pairs 28 of hook-shaped plastics profiles, which are firmly attached to the impulse welding bar, thus hooking the respective pairs together in a form-fitting manner. It is a property of grip seal strips of this type that their release force is significantly higher than the closing force, such that the non-stick coating 20 is securely held when the impulse welding bar 10 is in operation.

In the transverse direction, the grip seal profiles precisely specify the position of the non-stick coating, making manual alignment unnecessary. In the longitudinal direction, the friction between the profiles prevents slipping during use.

LIST OF REFERENCE SIGNS

10 Impulse welding bar
12 Main body
14 Cavity
16 Retaining groove
17 Support
18 Heating band
20 Non-stick coating
22 Retaining elements/grip seal strips
24 Flanks of the impulse welding bar
26 First parts of the retaining elements
28 First hook-shaped plastics profile pairs
30 First panel element
32 Recesses/grooves
34 Lower edges of the grooves
36 Second parts of the retaining elements
38 Second hook-shaped plastics profile pairs
40 Second panel elements
42 Edges of the non-stick coating

What is claimed is:

1. A device for welding plastics films, comprising:
   an impulse welding bar (10); and
   a detachable non-stick coating layer (20) held on lateral flanks (24) of the impulse welding bar (10); and
   retaining elements (22) of two or more parts and which act in a form-fitting manner in order to detachably fasten the non-stick coating layer (20) to both flanks (24) of the impulse welding bar (10);
   wherein first parts (26) of the retaining elements (22) are arranged on the flanks (24) of the impulse welding bar (10) and second parts (36) of the retaining elements (22) are arranged on the non-stick coating layer (20);
   wherein the first parts (26) of the retaining elements (22) are glued to the flanks (24) of the impulse welding bar (10);
   wherein the flanks (24) of the impulse welding bar (10) have recesses (32) which wholly or partially accommodate the first parts (26) of the retaining elements (22).

2. The device according to claim 1, wherein the flanks (24) of the impulse welding bar (10) have recesses (32) which wholly or partially accommodate the first parts (26) of the retaining elements (22).

3. The device according to claim 1, wherein the retaining elements are designed as spring snap fasteners.

4. The device according to claim 1, wherein the retaining elements are designed as hook-and-loop fasteners.

5. The device according to claim 1, wherein the retaining elements (22) are designed as grip seal strips.

6. The device according to claim 5, wherein the recesses that accommodate the first parts (26) are grooves in the flanks (24) of the device (10) in which the grip seal strips (22) are located.

7. The device according to claim 5, wherein the second parts (36) of the grip seal strips (22) are attached to edges of the non-stick coating layer (20) which spans the device (10).

8. The device according to claim 1, wherein the non-stick coating layer (20) is formed by a coated fibre fabric.

9. The device according to claim 8, wherein the fibre fabric is coated or laminated with PTFE.

10. The device according to claim 1, wherein a heat-resistant area on an upper side of the device (10) has an impulse heating band (18) there over.

11. The device according to claim 10, wherein the impulse welding bar (10) has a retaining groove (16) on an upper side of the device (10) is adapted for receiving a heat-resistant support (17) which forms the heat-resistant area.

12. The device according to claim 11, wherein the heat-resistant support (17) is made of a silicone rubber material.

* * * * *